(12) United States Patent
Straub

(10) Patent No.: X9503
(45) Date of Patent: Mar. 12, 1836

(54) WATER WHEEL

(76) Inventor: Abraham Straub

Abraham Straub, Milton, Northumberland Co. Pen.
Letters Patent;
The Schedule referred to in these Letters Patent and making part
of the same containing a description in the words of the said Abra
ham Straub himself of his improvement "In the construction
of the Reaction Water wheel."
To all to whom these presents shall come —
Be it known that I, Abraham Straub of the Borough of Milton
and County of Northumberland and State of Pennsylvania have
invented a new and useful improvement in the construction of the
"Reaction Water" wheel which has not been heretofore used or known
the nature of which is such as to present an involute shaped
bucket or float, to the action of the head of water; under such
an improved mode of constructing this involute, as that its dis
tance from its centre shall increase, regularly and continually
thereby affording an uninterrupted discharge of the water with
out any assistance being afforded from the imperfections of shape
found in those methods heretofore used always provided that
there shall be two or more points of discharge for the water or
outlets, placed at regular distances for the purpose of affording
the requisite balance in the motion of the whole. The space the
said involute is to occupy must be placed as near to the circum
ference of the circular case of the wheel as practicable and
the manner and the principle of constructing this involute
is set forth in the following description — Having determined the
required ~~circumference of the circular case or wheel, space and set off~~
~~in from towards the centre~~ such a space as may be desired, for the gradual
unfolding of the involute from its commencement to its terminatio
n outlet; Then let the centre on which it is to be formed, be of such
circumference as to equal that portion of the radius cut off,
by this said space and pass around it a thread long enough
after completing the said circumference, to extend to the spot near
the centre, from whence the involute will commence and with the described the inside curve (when the float is to be carried all the
way round) and the distance it drops from the point of start
to this end will be the outlet for the water, including the thick-
of the involute. Then in order to get that one for the outside re-
reduce the size of the centre so much as that the same thre[illegible]
when applied around it shall pass the first described cu[illegible]
to a distance equal to the thickness desired for the involute at
commencement from which point the progress of the end of t[illegible]
thread when unlapped will be found to describe another c[illegible]
gradually approaching the first described one so as to form
the thickness of the involute float upon a regular taper, t[illegible]
outlet or point of discharge. The same process is used for form-
[illegible] involutes where two or more are to be used, always bear-
in mind the necessary increase of circumference to be given to [illegible]
centre according to the number of said involutes required - as two
volutes will require the centre to be twice the diameter, that [illegible]
would for only half the distance, is to be gone over at the circum-
ence of the case & yet the drop or width of outlet must be the s[illegible]
So for three involutes - it will require a centre of three times [illegible]
circumference &c. It will also be evident that the diameter of
wheel, the number of the floats, and the quantity of water to be [illegible]
charged, is always to be in proportion to the height of the head of
water, and to the power required. The first described curve with
its commencement be continued a little beyond the line of the
[illegible] meter of the wheel whereon I have described both the curves [illegible]
terminate so that they shall there allow and edge to be form-
by another curve, brought from the commencement of the secon-
described one, and diminishing the thickness of the involut[illegible]
to said edge, so as to afford every facility for the water to pass.

What I claim as my invention and for wh[illegible]
I now ask Letters Patent is, the manner of forming the abo[illegible]
described involute floats, according to the principles of constr-
tion above set forth & explained. In testimony that the abo[illegible]

United States Patent

Patent No.: X9503 a full description of my improvement I have hereunto set my hand

Witnesses
Henry Stone
B H Morsell

Abraham Sluaut

Esq.

(100 words)

(Patented 12th day of March 1836)

(Rec.d & Recorded anew January 30th 1839)